United States Patent [19]

Olson, II

[11] Patent Number: 4,747,200

[45] Date of Patent: May 31, 1988

[54] METHOD OF ASSEMBLING A TRIPOD UNIVERSAL JOINT

[75] Inventor: Dean A. Olson, II, Rockford, Ill.

[73] Assignee: Rockford Acromatic Products Co., Rockford, Ill.

[21] Appl. No.: 33,782

[22] Filed: Apr. 3, 1987

[51] Int. Cl.⁴ .............................................. B23P 17/00
[52] U.S. Cl. ....................................... 29/423; 29/436; 29/453
[58] Field of Search ................. 29/423, 434, 436, 453; 464/111

[56] References Cited

U.S. PATENT DOCUMENTS

| | | | |
|---|---|---|---|
| 3,792,598 | 2/1974 | Orain | 464/111 |
| 3,805,551 | 4/1974 | Mangiavacchi et al. | 464/111 |
| 4,336,696 | 6/1982 | Tsukiyama et al. | 464/111 |

Primary Examiner—P. W. Echols
Assistant Examiner—Andrew E. Rawlins
Attorney, Agent, or Firm—Leydig, Voit & Mayer

[57] ABSTRACT

A tripod universal joint includes a shaft with a forked end or tulip which is held in assembled relationship with a tripod spider by a spring clip having angularly spaced legs adapted to snap releasably into grooves in the tulip. The spider is located in a cup-shaped housing. To facilitate assembly of the tulip with the spider, a resiliently flexible washer is placed on the bottom of the housing and holds the spring clip upwardly in a position permitting the legs of the clip to interlock with the tulip when the tulip is moved axially toward the clip. After assembly of the tulip with the clip has been completed, the spacer washer is removed from the housing by pulling on a flexible retrieval wire which is attached to the washer.

6 Claims, 2 Drawing Sheets

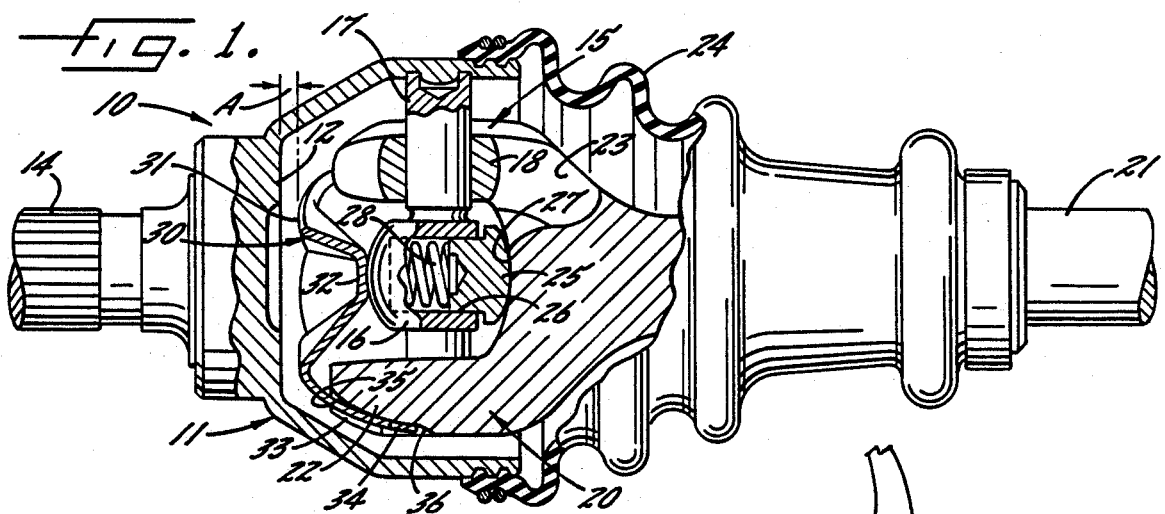
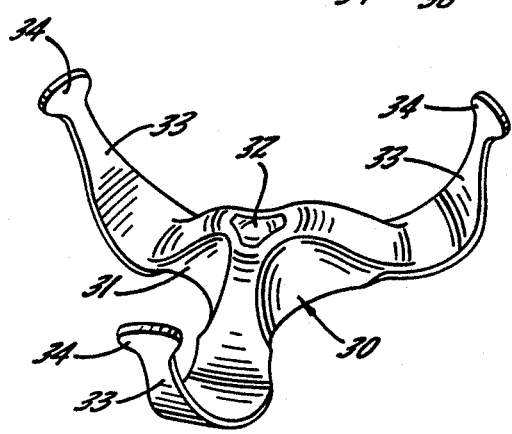
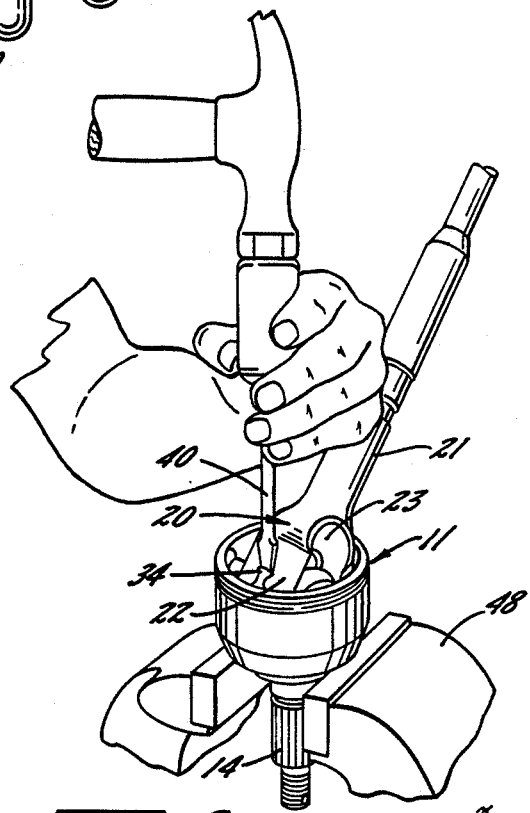
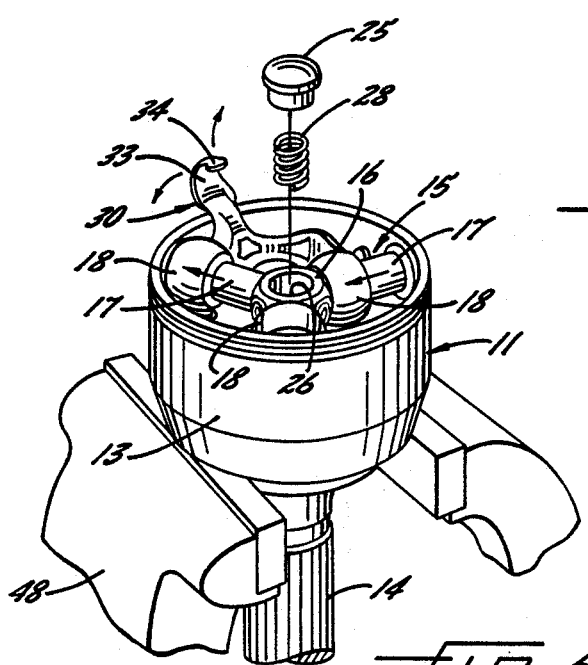
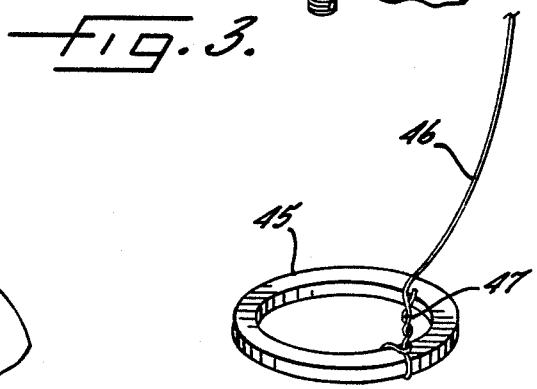

METHOD OF ASSEMBLING A TRIPOD UNIVERSAL JOINT

BACKGROUND OF THE INVENTION

This invention is concerned generally with universal joints and more particularly with tripod universal joints of the fixed center type. Universal joints of this type are conventionally used in the drive lines of front wheel drive vehicles to transmit torque from the transmission of the vehicle to the front wheels thereof.

A tripod universal joint of the same general type as is under consideration here is disclosed in Futamura et al U.S. Pat. No. 4,421,494. Such a universal joint comprises a housing having a bottom wall and an annular side wall. A spider is located in the housing in spaced relation with the bottom wall and includes a center portion and three angularly spaced trunnions. The trunnions extend radially from the center portion of the spider and are fixed to the side wall of the housing. Each trunnion supports a roller which is adapted to rotate on and slide along the trunnion.

The universal joint further includes a forked shaft having three angularly spaced jaws separated by three angularly spaced slots defining raceways. When the shaft is assembled with the housing and the spider, the rollers of the spider are received in and are adapted to ride along the slotted raceways of the shaft. A centering button with a spherically shaped nose is spring-biased against an inside bearing surface of the forked shaft and causes the universal joint to have a fixed center of angulation.

The universal joint is completed by a retaining clip which has a central base and three angularly spaced spring legs extending axially from the base. The retaining clip is located within the housing near the bottom thereof and its resilient legs are adapted to interlock with the jaws of the shaft in order to hold the shaft and the spider in assembled relation.

After extended wear occurs, it may be necessary to disassemble the universal joint and replace certain ones of its components. In particular, it is frequently necessary to replace the retaining clip, the centering button and the spring or springs which act against the centering button. In cases of extreme wear, it may be necessary to replace the forked shaft.

Once the universal joint has been disassembled for repair, re-assembly of the parts presents a difficult problem. In particular, it is difficult to re-assemble the forked shaft with the spring retaining clip since the dimensional relationships between various components of the joint prevent the shaft from being pushed sufficiently far into the housing to effect a snap interlock between the shaft and the clip.

SUMMARY OF THE INVENTION

The general aim of the present invention is to provide a new and improved method which, while being very simple to perform, enables quick and easy reassembly of the components of a universal joint of the above general type.

A more detailed object of the invention is to achieve the foregoing by temporarily supporting the retaining clip on the bottom of the housing with a spacer which locates the clip in a position enabling the clip to interlock with the forked shaft, and which may be easily removed from the housing after assembly of the shaft and the clip has been effected.

The invention also resides in the use of a yieldable spacer which may flex around the components of the universal joint during removal of the spacer from the housing, and also in the use of a flexible line for retrieving the spacer from the housing.

These and other objects and advantages of the invention will become more apparent from the following detailed description when taken in conjunction with the accompanying drawings.

BRIEF DESSCRIPTION OF THE DRAWINGS

FIG. 1 is a cross-sectional view of a typical universal joint adapted to be re-assembled by the unique method of the present invention.

FIG. 2 is a perspective view of the retainer clip of the universal joint of FIG. 1.

FIG. 3 is a perspective view showing one of the initial steps involved in disassembling the joint.

FIG. 4 is a perspective view showing subsequent disassembly steps.

FIG. 5 is a perspective view of a typical spacer and retrieval line used in practicing the method of the present invention.

DETAILED DESCRIPTION OF THE PREFERRED EMBODIMENT

Figure 6:
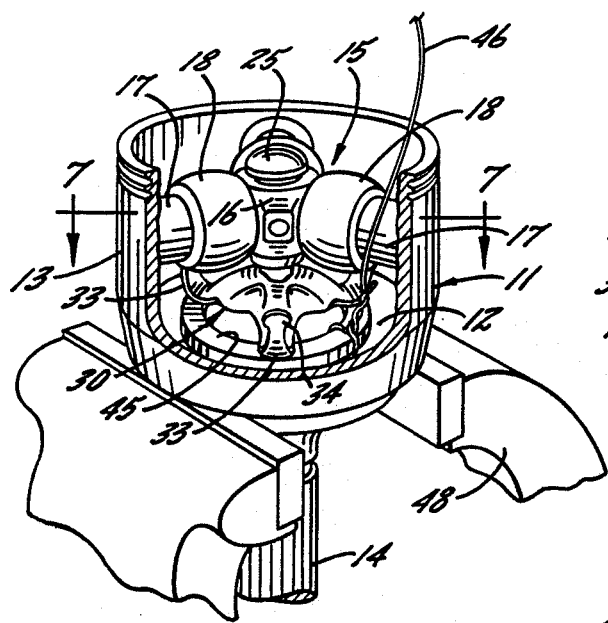
FIG. 6 is a perspective view showing certain ones of the re-assembly steps of the method of the invention.

For purposes of illustration, the present invention is shown in the drawings in connection with a tripod universal joint 10 of the fixed center type. Such a universal joint is commonly used as the outboard joint in a drive line extending between the transmission and the front wheel of a front wheel drive vehicle.

The construction of the universal joint 10 itself is conventional and is quite well known. Briefly, the joint comprises a generally cup-shaped housing 11 having a bottom wall 12 and an annular side wall 13. A splined drive spindle 14 is joined to and projects axially from the end wall 13.

Figure 7:
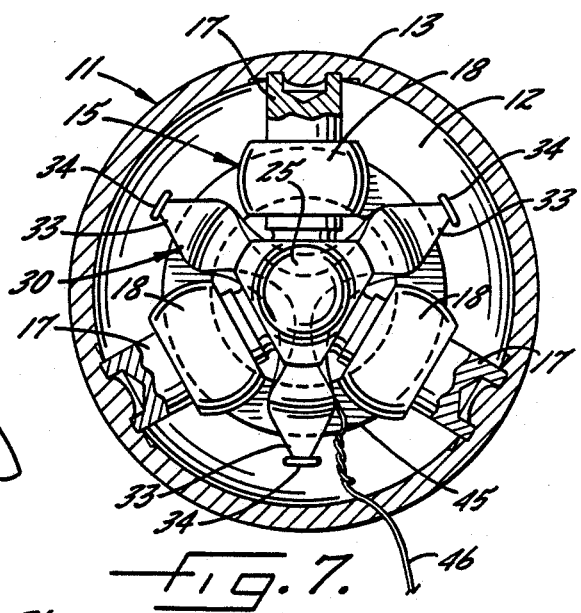
FIG. 7 is an enlarged fragmentary cross-section taken substantially along the line 7—7 of FIG. 6.

Located within the housing 11 in spaced relation with the end wall 12 is a tripod spider 15 having a center portion 16. Three angularly spaced trunnions 17 (FIG. 7) extend radially from the center portion of the spider and have outer ends which are fixed to the side wall 13 of the housing. Each trunnion supports a roller 18 adapted to rotate on and slide along the trunnion, the outer surfaces of the rollers being generally spherical.

Figure 10:
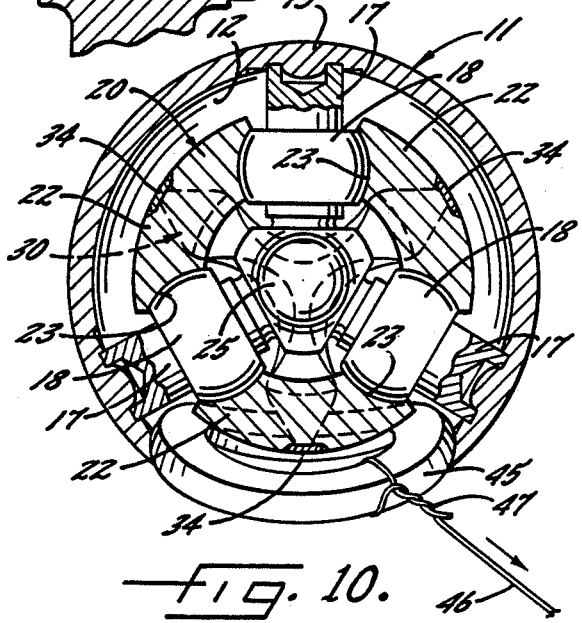
FIG. 10 is an enlarged cross-section taken substantially along the line 10—10 of FIG. 8 and shows the final step of the method.

The rollers 18 coact with the forked end portion 20 of an elongated shaft 21. The forked end portion of the shaft is commonly referred to as a "tulip" and it includes three angularly spaced jaws 22 (FIG. 10) separated by three angularly spaced slots 23 which form raceways for the rollers 18 of the spider 15. When the tulip 20 is in assembled relation with the spider 15, the rollers 18 are received in the slots 23. The rollers turn within the slots as the tulip articulates relative to the spider. A flexible boot 24 (FIG. 1) seals the shaft 21 to the housing 11 and serves to retain lubricant in the housing while preventing dirt from entering the housing.

To cause the joint 10 to have a fixed center of articulation, a centering button 25 (FIGS. 1 and 4) is slidably received in a hole 26 in the center portion 16 of the spider 15 and is formed with a spherically-shaped surface which engages a similarly shaped bearing surface 27 formed on the inside of the tulip 20 and facing the bottom wall 12 of the housing 11. A coil spring 28 is located in the hole 26 and biases the centering button 25 against the bearing surface 27.

The universal joint 10 is completed by a spring retaining clip 30 (FIG. 2) which holds the spider 15 and the tulip 20 in assembled relation. As shown most clearly in FIG. 2, the retaining clip is made from a single piece of spring metal and includes a base 31 which is formed with a seat 32 for supporting the center portion 16 of the spider 15. Three angularly spaced legs 33 radiate from the base and then extend axially away from the base. An enlarged ear 34 is formed on the free end portion of each leg.

When the components of the joint 10 are in assembled relation, the legs 33 of the clip 30 are received in grooves 35 in the jaws 22 of the tulip 20 while the ears 34 are received with a snap fit in enlarged pockets 36 formed at the closed ends of the grooves. Thus, the legs and the ears resiliently embrace and interlock with the tulip 20 to hold the tulip in assembled relation with the spider 15 and to prevent axial separation of the two. When the joint 10 is fully assembled, there is a space of significant distance between the end wall 12 of the housing 11 and the base 31 of the clip 30 as indicated by the dimension "A" in FIG. 1.

After extended service use, certain parts of the universal joint 10 may require replacement and particularly if a puncture or tear in the boot 24 has allowed dirt and water to enter the housing 11 and create excessive wear of the parts. In many instances, it is necessary to replace the centering button 25, the spring 28 and the spring clip 30 and, in more severe cases, replacement of the shaft 21 may be required if the tulip 20 has experienced extreme wear.

In order to replace the worn parts, it is, of course, necessary to disassemble the universal joint 10. This can be achieved in a fairly simple manner by cutting away the boot 24. Thereafter, a tool such as a screwdriver 40 (FIG. 3) is used to pry the ears 34 of the clip 30 out of the pockets 36 of the tulip 20 and thereby free the tulip from the clip and the spider 15. The tulip then may be pulled out of the housing 11.

Once the tulip 20 has been removed from the housing 11, the centering button 25 and the spring 28 may be removed from the hole 26 in the center portion 16 of the spider 15 as shown in FIG. 4. Also, the clip 30 may be removed from the housing 11. This is achieved by sliding one of the rollers 18 to the extreme inner end of its trunnion 17 while sliding an adjacent roller to the extreme outer end of its trunnion (see FIG. 4) so as to establish a large clearance space between the spider 15 and the side wall 13 of the housing 11. The clip 30 then may be removed edgewise from the housing by withdrawing the clip through the clearance space as shown in FIG. 4.

While the universal joint 10 may be disassembled in a relatively easy manner, re-assembly of the joint with new parts presents a more difficult problem. Specifically, difficulty is encountered in assembling the clip 30 with the tulip 20 and effecting a snap interlock between the ears 34 of the clip and the pockets 36 of the tulip. Although the ears can be pried out of and sprung away from the pockets one at a time and in a relatively easy manner, it is very difficult to place all three of the ears into simultaneous interlocking engagement with the pockets using ordinary tools. Another possible way of assembling the tulip 20 with the clip 30 is to push the tulip axially relative to the clip until the ears 34 snap into the pockets 36. But, if the clip is located on and held axially by the end wall 12 of the housing 11, the bearing surface 27 of the tulip 20 bottoms against the centering button 25 and stops endwise movement of the tulip well before the pockets 36 can reach and receive the ears 34.

The present invention solves the re-assembly problem through the use of a flexible and very simple spacer 45 which temporarily fills the dimension "A" between the end wall 12 of the housing 11 and the base 31 of the clip 30 and locates the clip in such a manner that the pockets 36 of the tulip 20 may move axially to a position receiving the ears 34 of the clip. The preferred spacer simply is a washer made of rubber or other flexible material. Importantly, a retrieval line 46 is attached to the washer to enable the washer to be removed from the housing 11 once the joint 10 has been re-assembled. In the present instance, the retrieval line 46 is simply a piece of ordinary flexible wire having one end portion threaded through the washer 45 and twisted back upon itself as indicated at 47 in FIG. 5.

To re-assemble the joint 10, the housing 11 is clamped in a vise 48 or other suitable fixture and is located with its end wall 12 facing upwardly (see FIGS. 6 to 9). With the housing so positioned, the new spring 28 and the new centering button 25 may be inserted into the hole 26 in the spider 15.

The washer 45 then is placed in the housing 11 and is allowed to rest in a centered position on the end wall 12 of the housing. The retrieval wire 46, having been previously attached to the washer, is positioned so that the free end portion of the wire extends upwardly out of the housing (see FIGS. 6 and 8).

Figure 8:
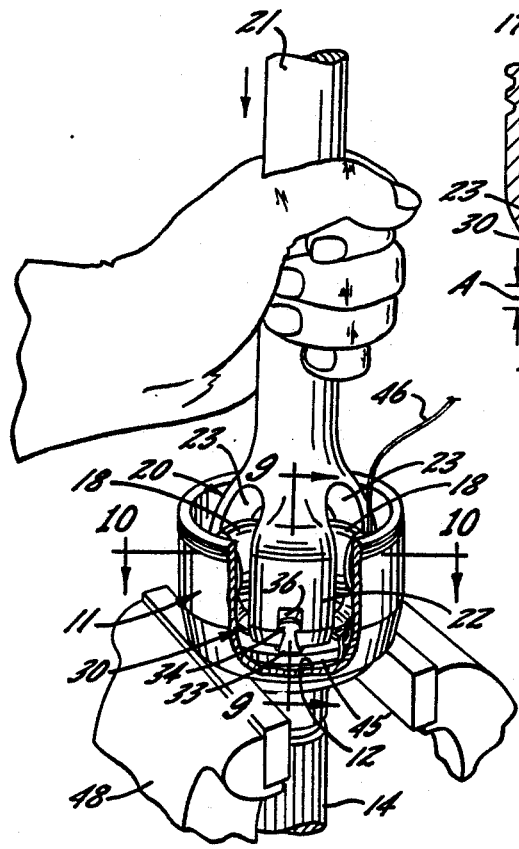
FIG. 8 is a perspective view showing a subsequent re-assembly step.
Figure 9:
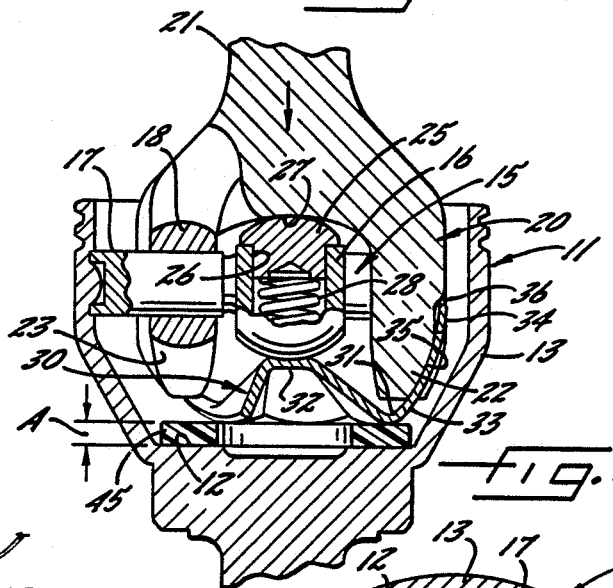
FIG. 9 is an enlarged fragmentary cross-section taken substantially along the line 9—9 of FIG. 8.

With the washer 45 so positioned, the new clip 30 is maneuvered into the housing 11 in a reverse manner from that shown in FIG. 4 and is placed on top of the washer. The washer holds the clip upwardly off of the bottom wall 12 of the housing 11 and locates the ears 34 at a relatively high elevation. Accordingly, when the tulip 20 is pushed endwise into the housing as shown in FIG. 8, the pockets 36 are capable of reaching the level of the ears and thus the ears easily snap into and interlock with the pockets to hold the spider 15 and the tulip 20 in assembled relation.

After the spider 15 and the tulip 20 have been reassembled, removal of the washer 45 from the housing 11 is effected simply by pulling on the retrieval wire 46 to pull the washer out of the housing. Being made of flexible material, the washer is capable of flexing as necessary (see FIG. 10) in order to conform to the tulip and the housing and to slip edgewise between the two.

Thus, through the use of a simple washer 45 and a piece of wire 46, re-assembly of the universal joint 10 is greatly facilitated. It should be appreciated that the washer can take different shapes depending on the shape of the bottom wall 12 of the housing 11 in order to firmly hold the clip 30 in spaced relation with the bottom wall when the tulip 20 is assembled with the clip.

I claim:

1. A method of assembling a universal joint, said universal joint comprising:
   (A) a generally cup-shaped housing having a bottom wall and having an annular side wall, a spider located in said housing in spaced relation from said bottom wall; said spider having a center portion and having angularly spaced trunnions extending generally radially from said center portion and fixed to said side wall, and a roller rotatably and slidably supported on each of said trunnions;
   (B) a forked shaft having angularly spaced jaws separated by angularly spaced slots defining raceways, said slots being sized to receive said rollers; and
   (C) a retaining clip made of resiliently yieldable material, said clip having a base portion and having legs spaced angularly around and extending axially from the base portion of said clip, said legs being adapted to interlock with the jaws of said shaft to hold said shaft in assembled relation with said spider; said method comprising the steps of:
   (a) fixing said housing in an upright position with said bottom wall facing upwardly;
   (b) placing a spacer made of resiliently flexible material on the bottom wall of said housing adjacent the center thereof; said spacer having a flexible line attached thereto;
   (c) locating the free end of said flexible line outside of said housing;
   (d) placing said clip in said housing with the legs of said clip extending upwardly and with
   the base portion of said clip resting on said spacer;
   (e) inserting said shaft downwardly into said housing to cause the slots in said shaft to slip over said rollers and to cause the jaws of said shaft to snap into interlocking relation with the legs of said clip; and
   (f) removing said spacer from said housing by pulling upwardly on the free end portion of said flexible line.

2. A method as defined in claim 1 in which said spacer is a washer made of resiliently flexible material and having a central hole.

3. A method as defined in claim 2 in which said line is a strand of flexible wire, one end portion of said wire being threaded through the hole in said washer and being twisted around an adjacent portion of said wire.

4. A method of assembling a tripod universal joint of the fixed center type, said universal joint comprising:
   (A) a generally cup-shaped housing having a bottom wall and having an annular side wall, a spider located in said housing in spaced relation from said bottom wall; said spider having a center portion and having three angularly spaced trunnions extending generally radially from said center portion and fixed to said side wall, and a roller rotatably and slidably supported on each of said trunnions;
   (B) a forked shaft having three angularly spaced jaws separated by three angularly spaced slots defining raceways, said slots being sized to receive said rollers, said shaft having a bearing surface which faces the bottom wall of said housing;
   (C) a centering button supported slidably by the center portion of said spider, and a spring acting between the center portion of said spider and said centering button to urge the button against the bearing surface of said shaft; and
   (D) a retaining clip made of resiliently, yieldable material, said clip having a base portion and having three legs spaced angularly around and extending axially from the base portion of said clip, said legs being adapted to interlock with the jaws of said shaft to hold said shaft in assembled relation with said spider; said method comprising the steps of:
   (a) fixing said housing in an upright position with said bottom wall facing upwardly;
   (b) placing a spacer made of resiliently flexible material on the bottom wall of said housing adjacent the center thereof; said spacer having a flexible line attached thereto;
   (c) locating the free end of said flexible line outside of said housing;
   (d) placing said clip in said housing with the legs of said clip extending upwardly and with the base portion of said clip resting on said spacer;
   (e) assembling said spring and said button with the center portion of said spider;
   (f) inserting said shaft downwardly into said housing to cause the slots in said shaft to slip over said rollers and to cause the jaws of said shaft to snap into interlocking relation with the legs of said clip; and
   (g) removing said spacer from said housing by pulling upwardly on the free end portion of said flexible line.

5. A method as defined in claim 4 in which said spacer is a washer made of resiliently flexible material and having a central hole.

6. A method as defined in claim 5 in which said line is a strand of flexible wire, one end portion of said wire being threaded through the hole in said washer and being twisted around an adjacent portion of said wire.

* * * * *